United States Patent
Resch et al.

(10) Patent No.: US 10,620,878 B2
(45) Date of Patent: Apr. 14, 2020

(54) WRITE THRESHOLD PLUS VALUE IN DISPERSED STORAGE NETWORK WRITE OPERATIONS

(71) Applicant: International Business Machines Corporation, Armonk, NY (US)

(72) Inventors: Jason K. Resch, Chicago, IL (US); Greg R. Dhuse, Chicago, IL (US); Ravi V. Khadiwala, Bartlett, IL (US); Wesley B. Leggette, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 311 days.

(21) Appl. No.: 15/843,834

(22) Filed: Dec. 15, 2017

(65) Prior Publication Data

US 2018/0107429 A1 Apr. 19, 2018

Related U.S. Application Data

(63) Continuation-in-part of application No. 15/671,746, filed on Aug. 8, 2017, which is a continuation-in-part
(Continued)

(51) Int. Cl.
  *G06F 3/06* (2006.01)
  *G06F 11/10* (2006.01)
(52) U.S. Cl.
  CPC .......... *G06F 3/0659* (2013.01); *G06F 3/0604* (2013.01); *G06F 3/064* (2013.01);
(Continued)

(58) Field of Classification Search
  CPC ...... G06F 3/0644; G06F 3/0619; G06F 3/064; G06F 3/067; G06F 11/1076
  See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Ann J Lo
*Assistant Examiner* — Michelle T Bechtold
(74) *Attorney, Agent, or Firm* — Garlick & Markison; Timothy W. Markison; Patricia A. Markison

(57) ABSTRACT

A method includes receiving a write operation request for storage of a data segment of a data object in at least a portion of a dispersed storage network (DSN). The method further includes determining a write target number based on information related to the data segment and a write extra number based on system error rate. The method further includes establishing a write threshold plus value based on the write target number and the write extra number, where the write target number is greater than or equal to a write threshold number. The method further includes generating a set of write requests for a subset of the set of encoded data slices, where the subset includes the write threshold plus value of encoded data slices of the set of encoded data slices. The method further includes sending the set of write requests to a set of storage units.

14 Claims, 14 Drawing Sheets

Related U.S. Application Data of application No. 14/955,200, filed on Dec. 1, 2015, now Pat. No. 9,740,547.

(60) Provisional application No. 62/109,700, filed on Jan. 30, 2015.

(52) U.S. Cl.
CPC ............ *G06F 3/067* (2013.01); *G06F 3/0619* (2013.01); *G06F 11/1076* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,612,827 | B2 | 12/2013 | Gladwin et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029731 | A1* | 2/2011 | Cilfone ............... G06F 11/1076 711/114 |
| 2011/0107036 | A1* | 5/2011 | Resch .................... H04L 12/00 711/154 |
| 2011/0185258 | A1* | 7/2011 | Grube ................... G06F 16/182 714/763 |
| 2012/0030184 | A1* | 2/2012 | Driesen .................. G06F 16/25 707/703 |
| 2016/0328296 | A1 | 11/2016 | Abhijeet et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.

* cited by examiner

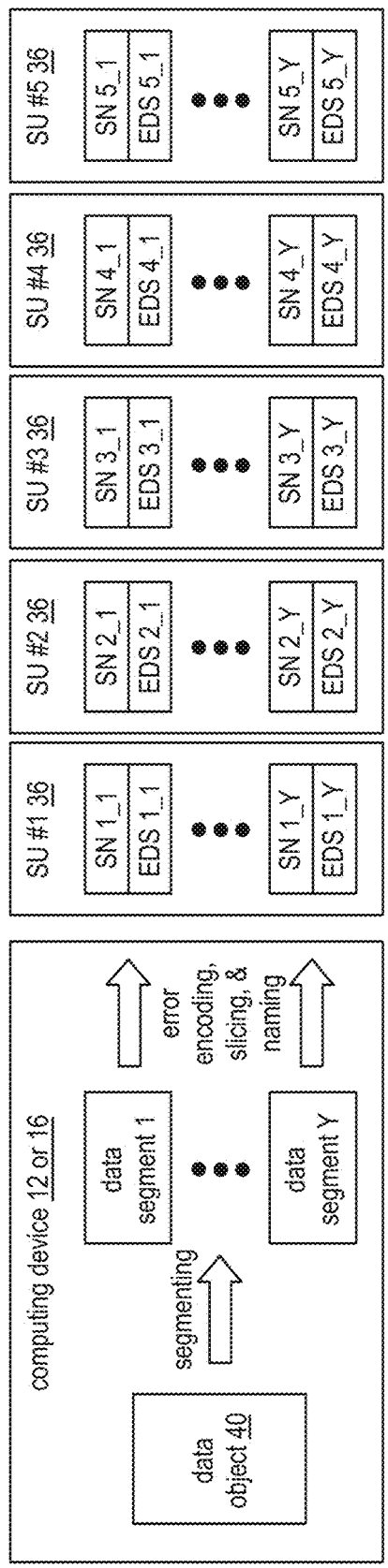
FIG. 3
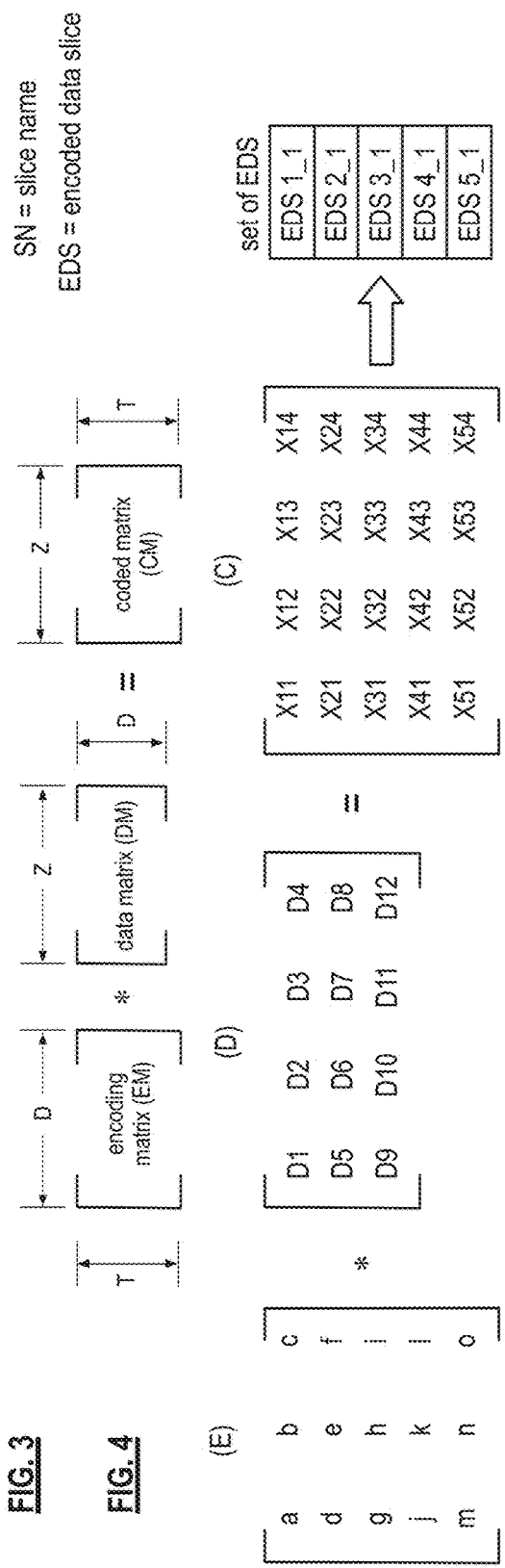
FIG. 4
FIG. 5
FIG. 6

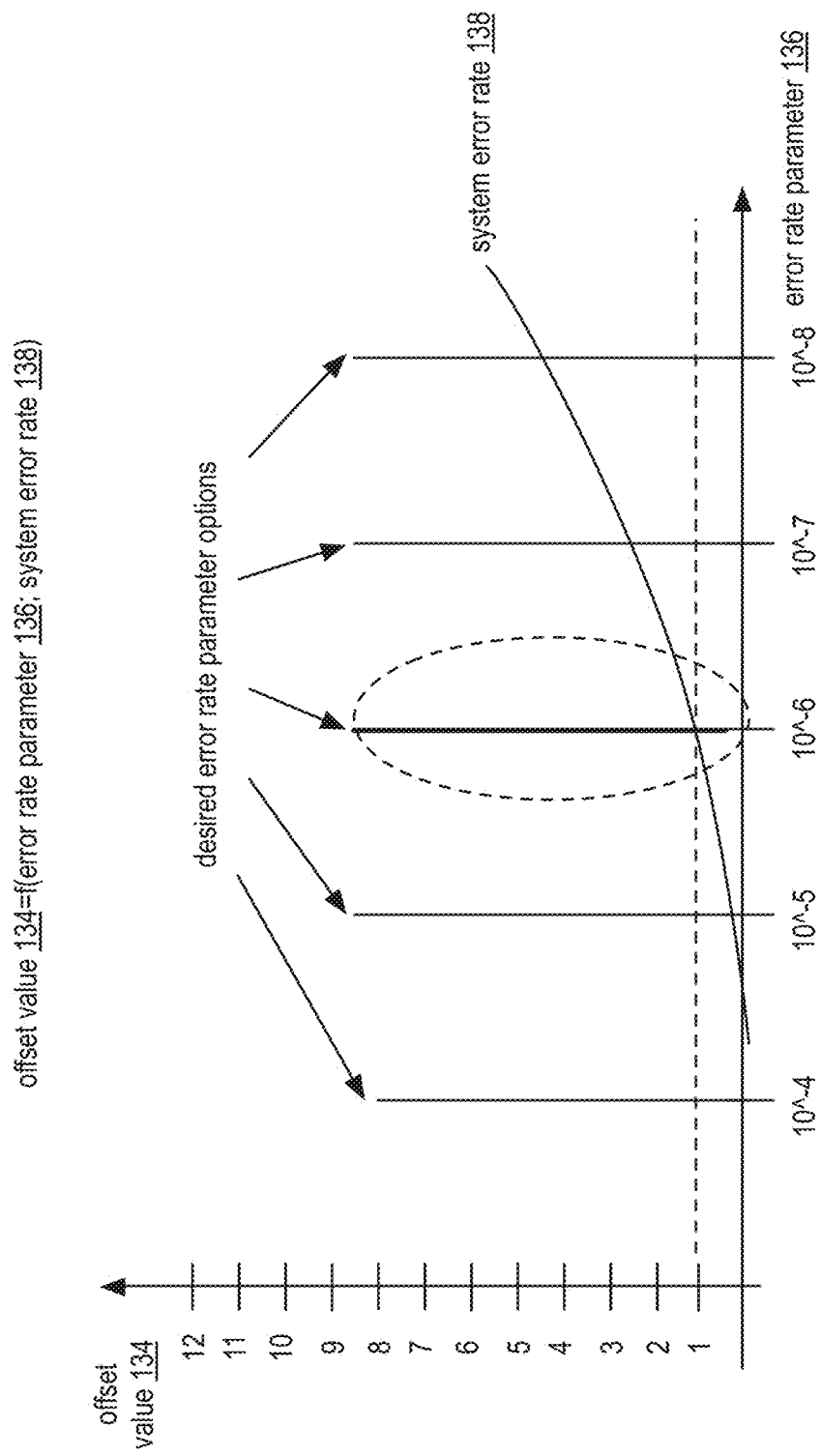

WRITE THRESHOLD PLUS VALUE IN DISPERSED STORAGE NETWORK WRITE OPERATIONS

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/671,746, entitled "STORING AND RETRIEVING DATA USING PROXIES," filed Aug. 8, 2017, which claims priority pursuant to 35 U.S.C. § 120 as a continuation-in-part of U.S. Utility application Ser. No. 14/955,200, entitled "STORING DATA USING A DUAL PATH STORAGE APPROACH," filed Dec. 1, 2015, now U.S. Pat. No. 9,740,547, issued on Aug. 22, 2017, which claims priority pursuant to 35 U.S.C. § 119(e) to U.S. Provisional Application No. 62/109,700, entitled "REDUNDANTLY STORING DATA IN A DISPERSED STORAGE NETWORK," filed Jan. 30, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

It is further known that in a dispersed storage network (DSN), writing to extra storage locations may waste both throughput and storage resources. Writing to extra storage locations allows for unexpected write errors to occur after the write operation begins without resulting in the extra latency needed to select new storage locations and issue another round of write requests. However, writing to more storage locations than needed wastes storage resources.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

Figure 11A:
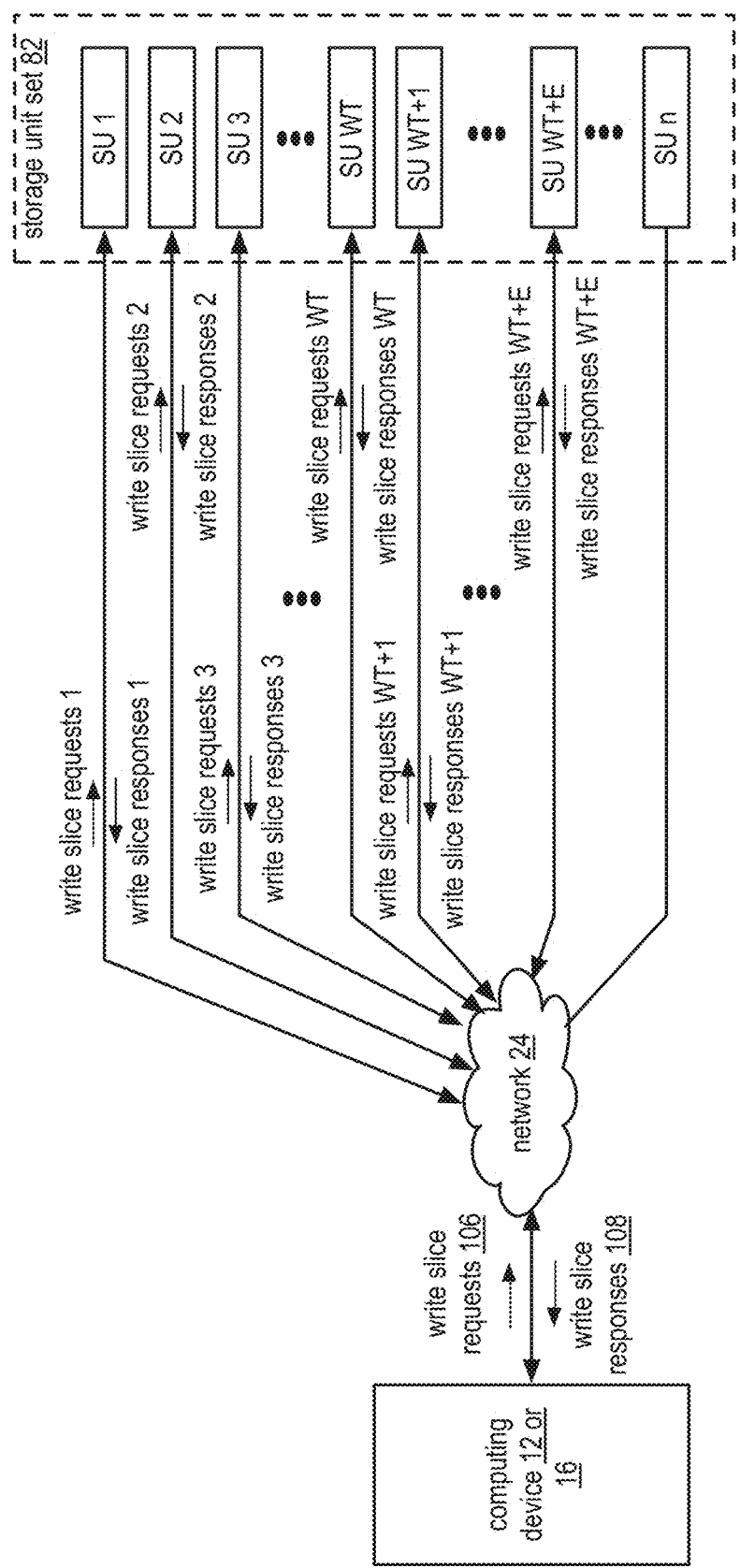
Figure 11B:
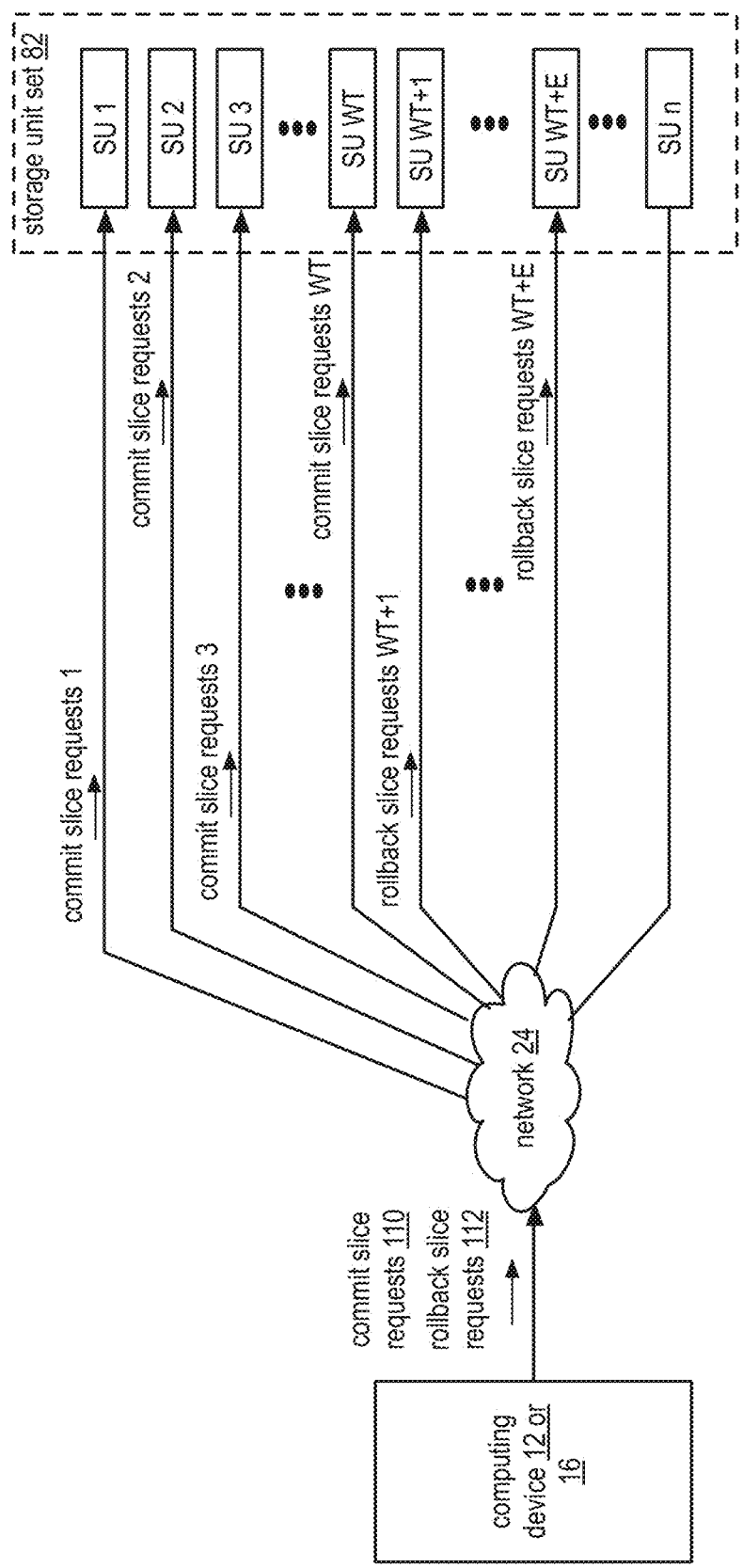
Figure 12:
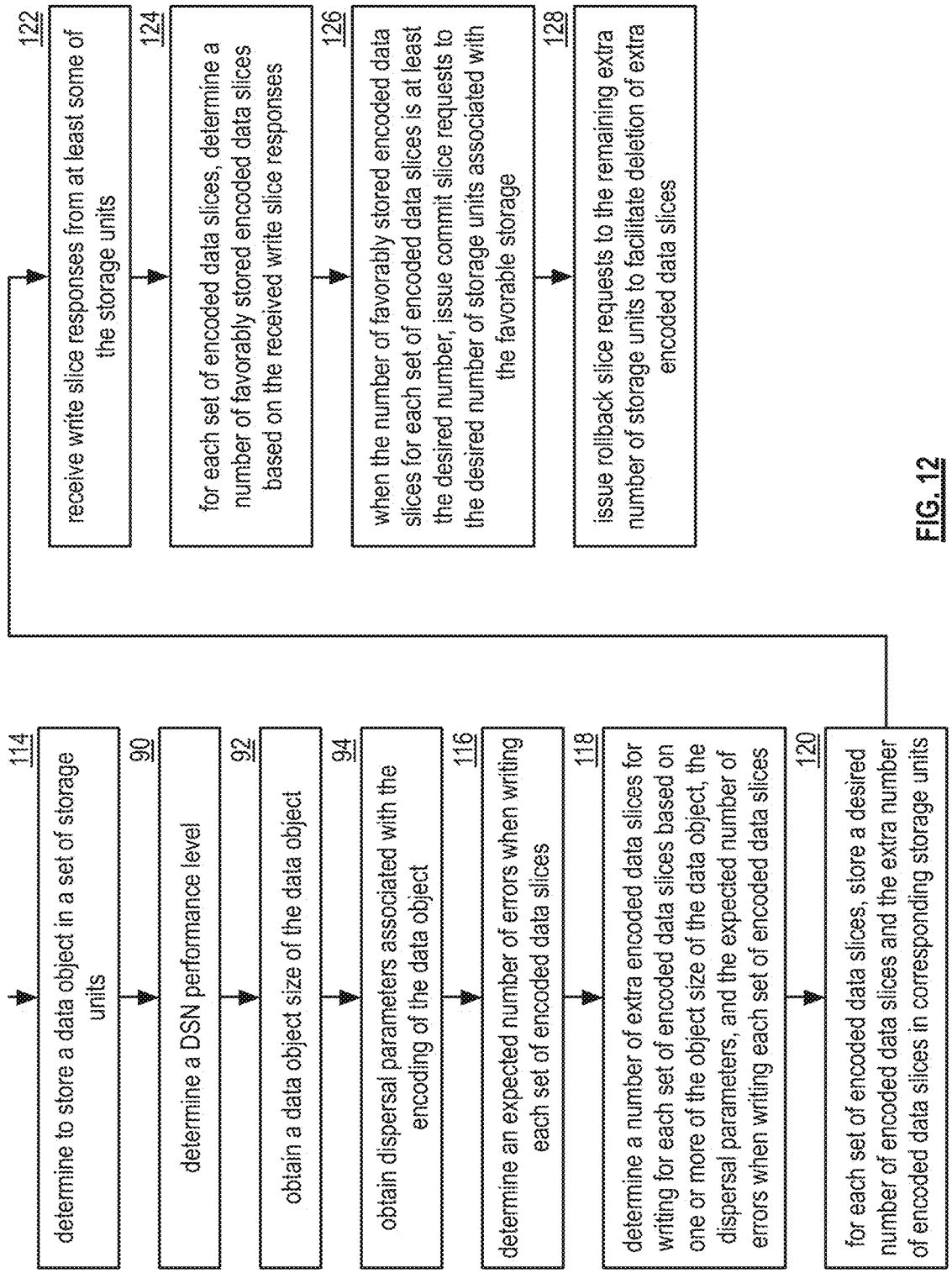
Figure 13A:
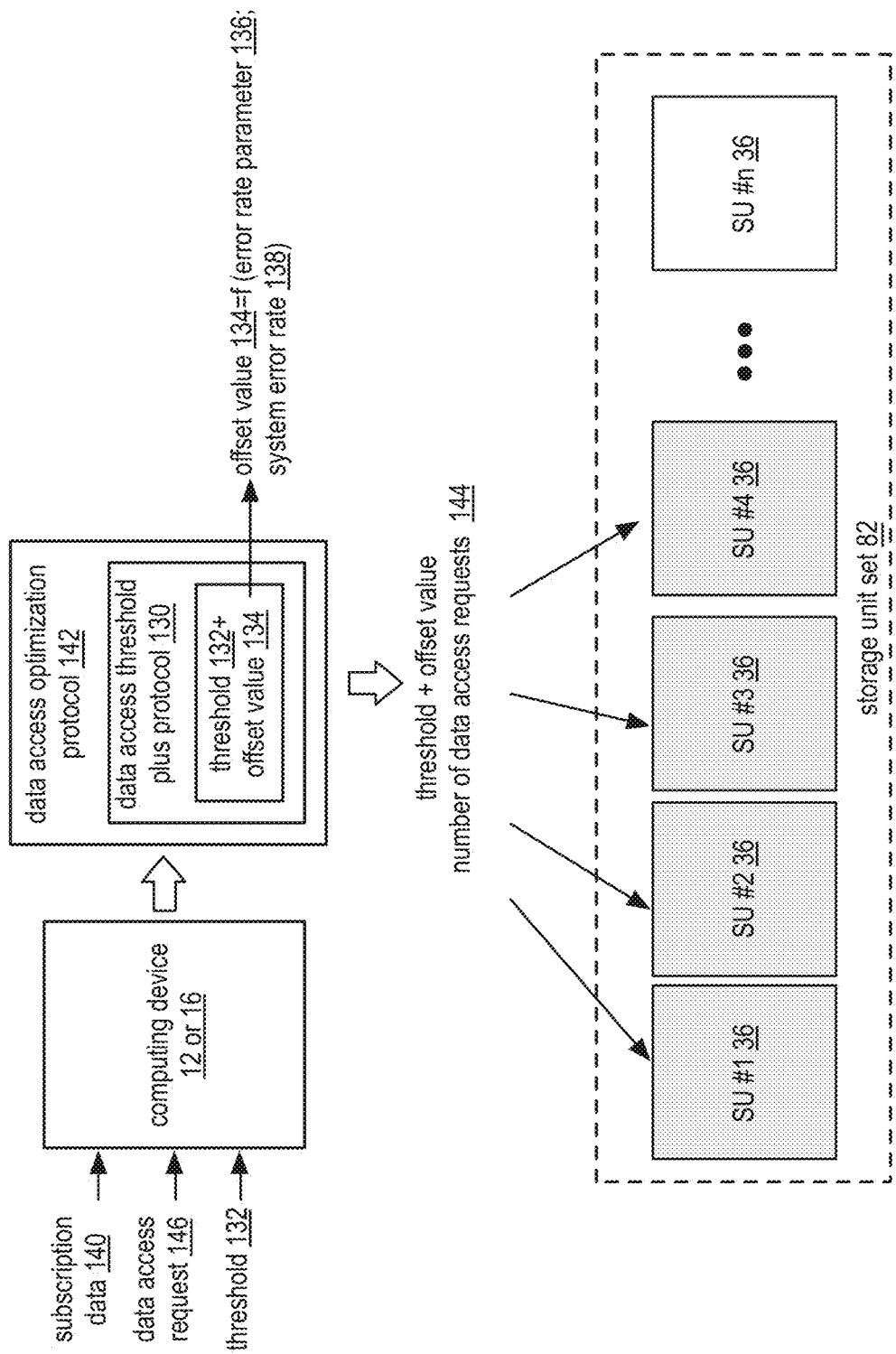
Figure 14:
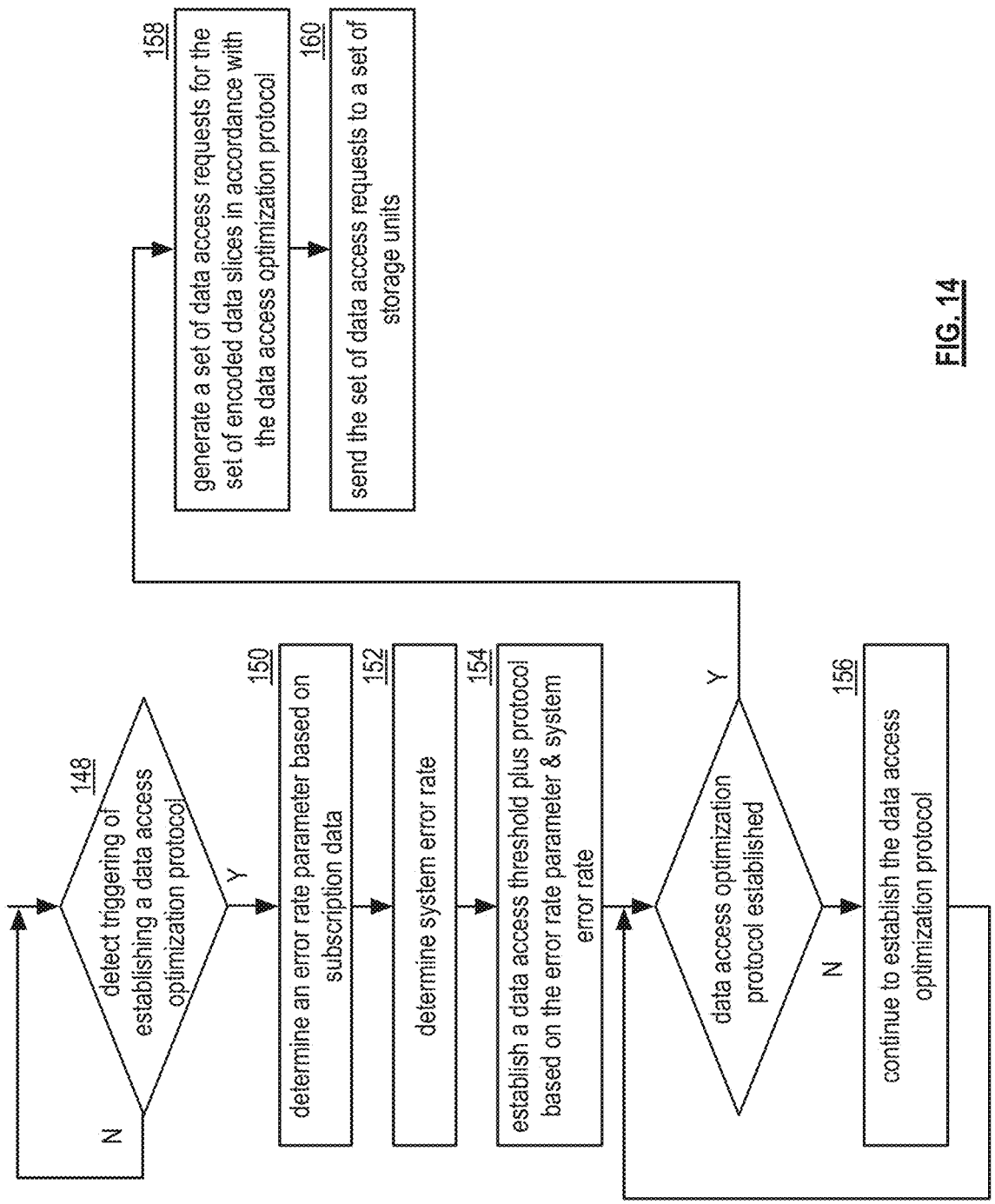
Figure 15:
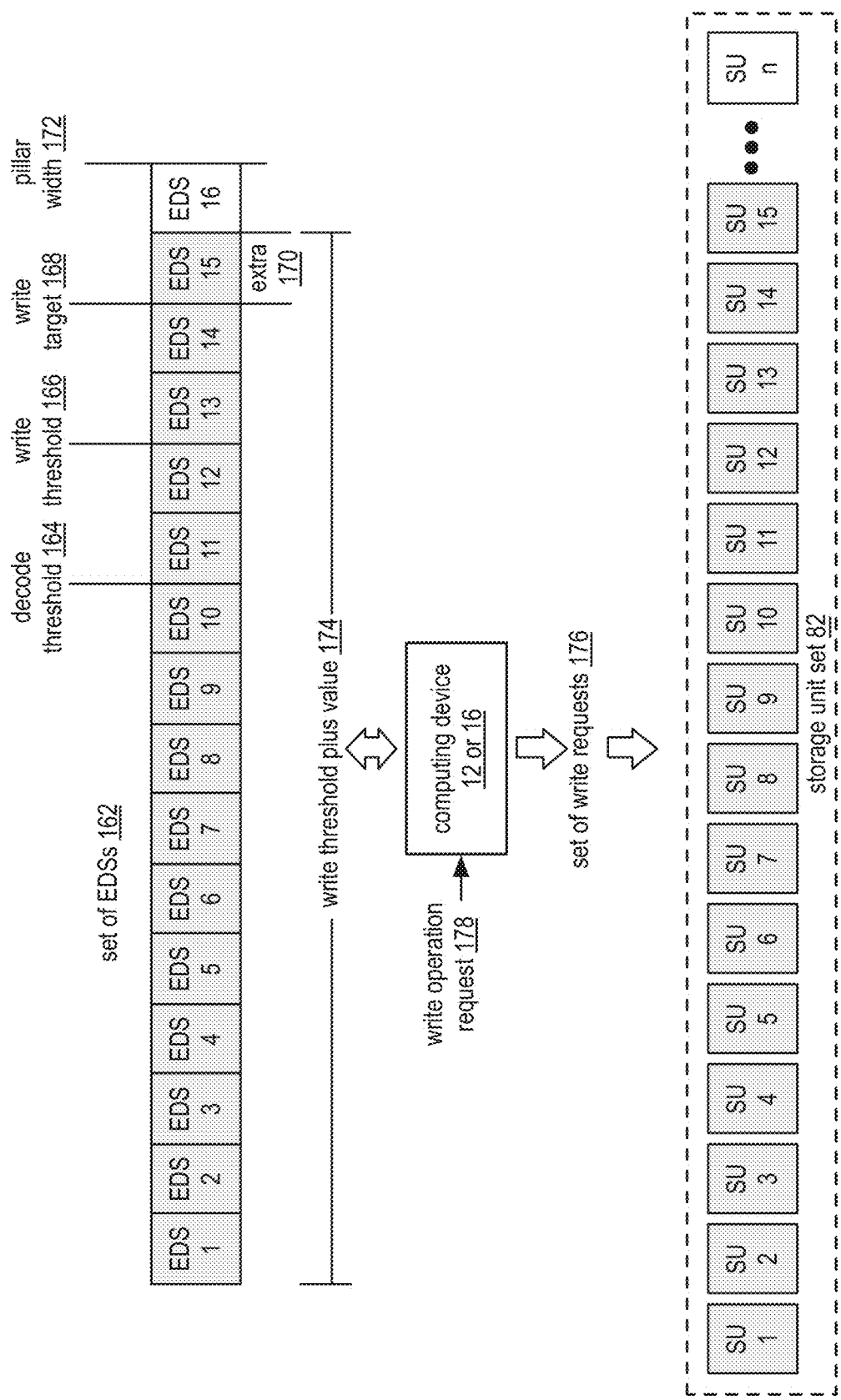
Figure 16:
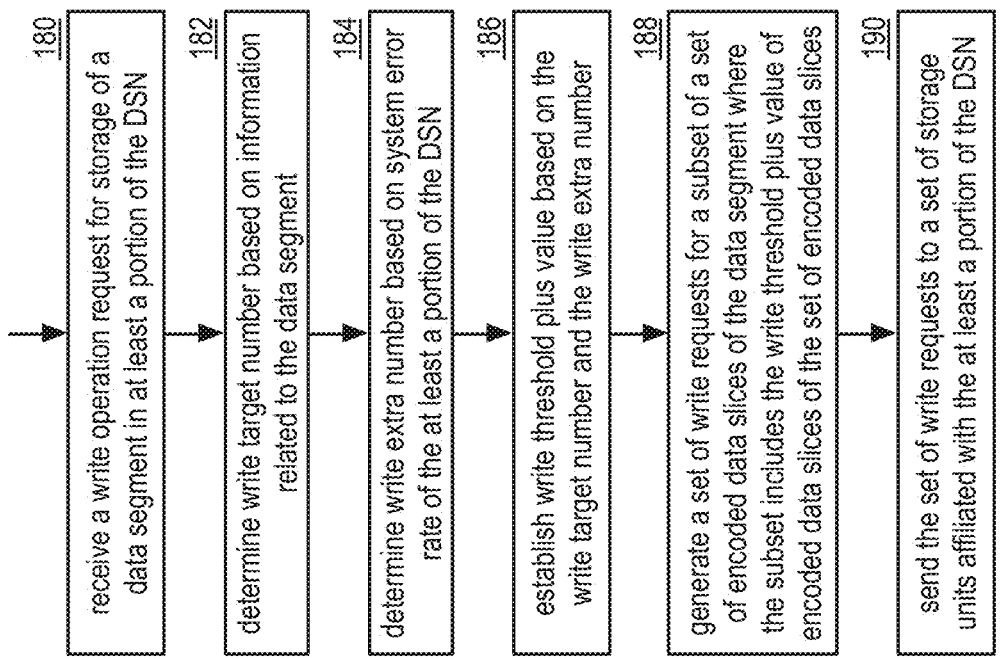

FIGS. 11A-B are schematic block diagrams of another embodiment of a dispersed storage network (DSN) in accordance with the present invention;

FIG. 12 is a logic diagram illustrating another example of storing data in accordance with the present invention;

FIG. 13A is a schematic block diagram of an example of a data access optimization protocol in a dispersed storage network (DSN) in accordance with the present invention;

FIG. 13B is an example of determining an offset value of a data access threshold plus protocol in accordance with the present invention;

FIG. 14 is a logic diagram of a method of utilizing a data access optimization protocol in a dispersed storage network (DSN) in accordance with the present invention;

FIG. 15 is a schematic block diagram of another example of a dispersed storage network (DSN) in accordance with the present invention; and FIG. 16 is a logic diagram of a method of utilizing a write threshold plus value in dispersed storage network (DSN) write operations in accordance with the present invention.

DETAILED DESCRIPTION OF THE INVENTION

Figure 1:
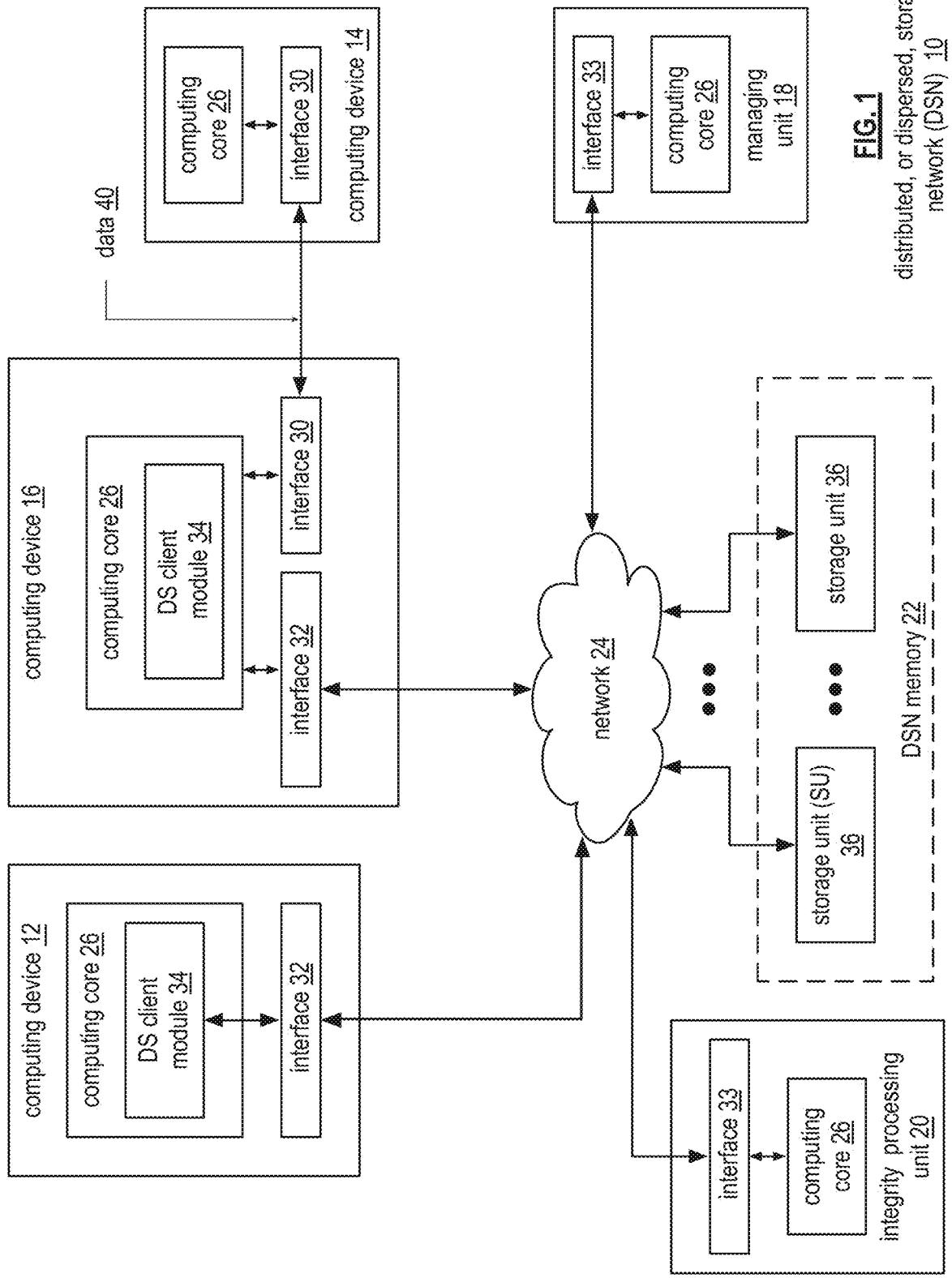
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
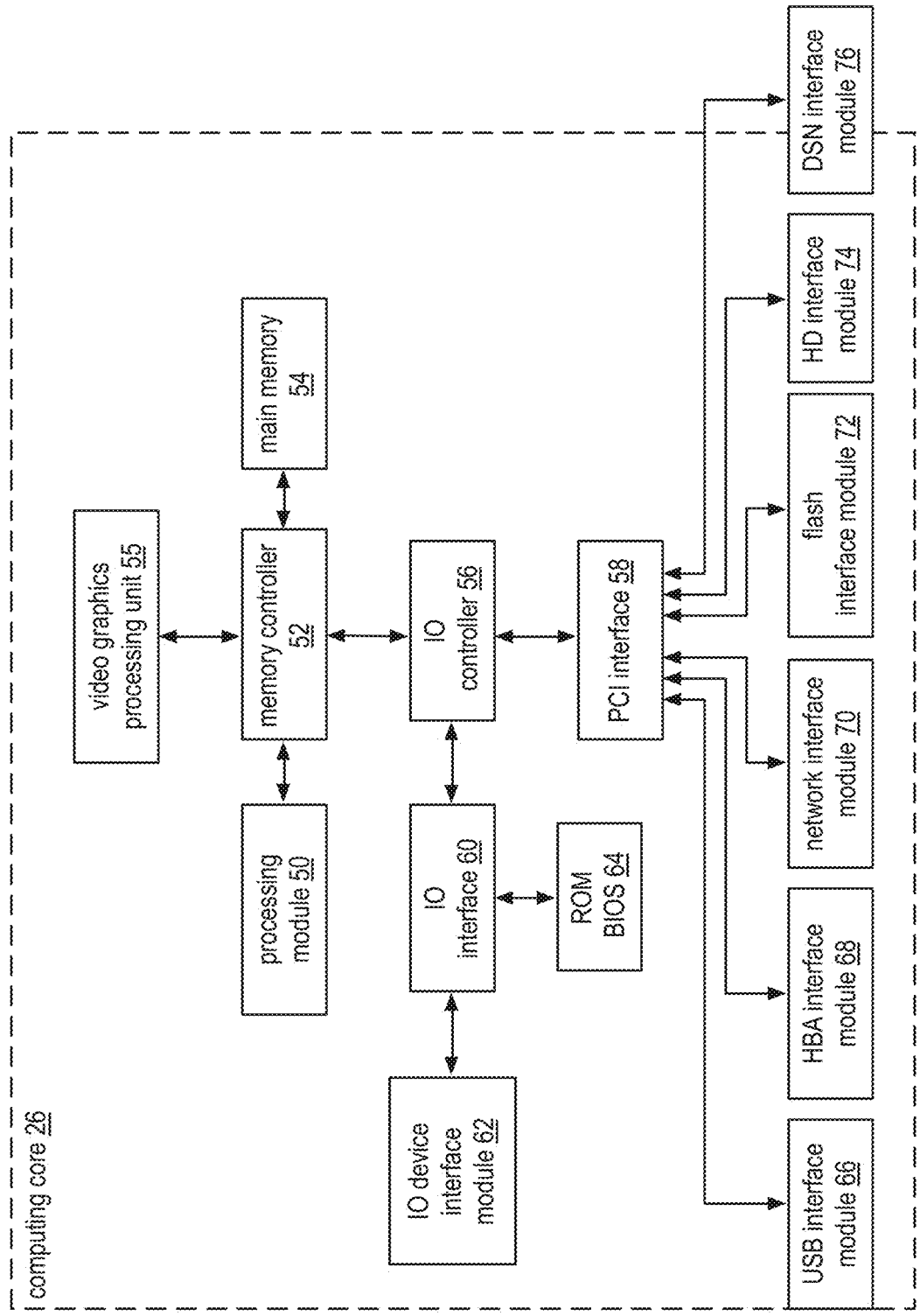
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
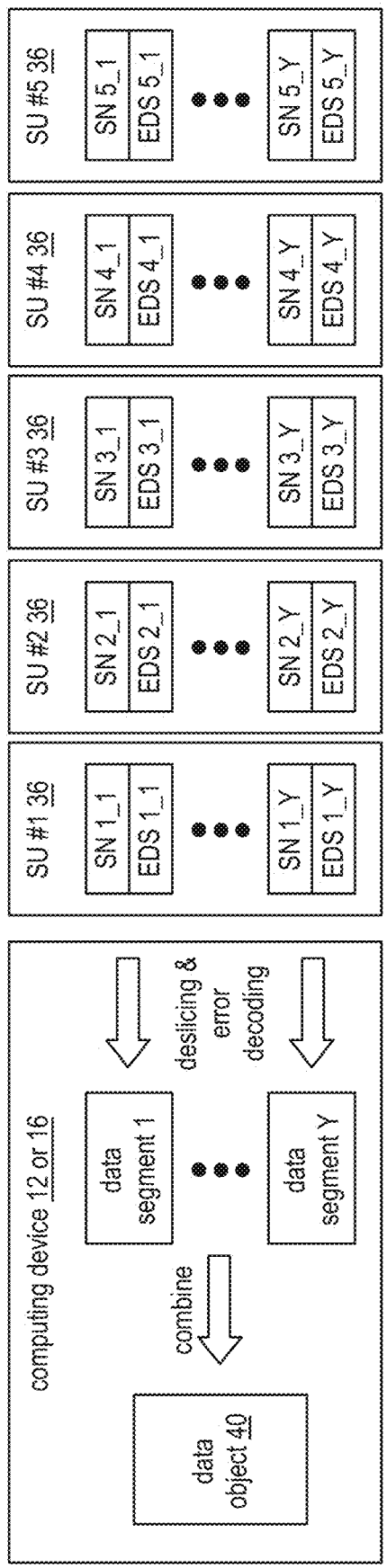
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
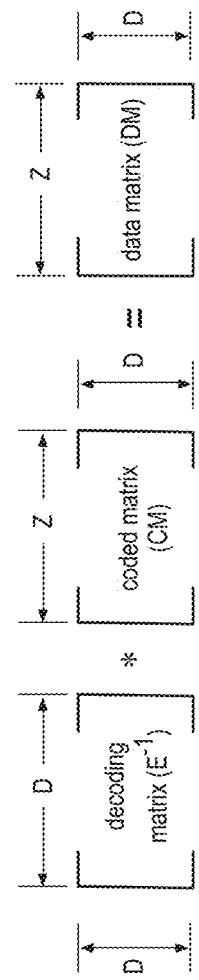
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
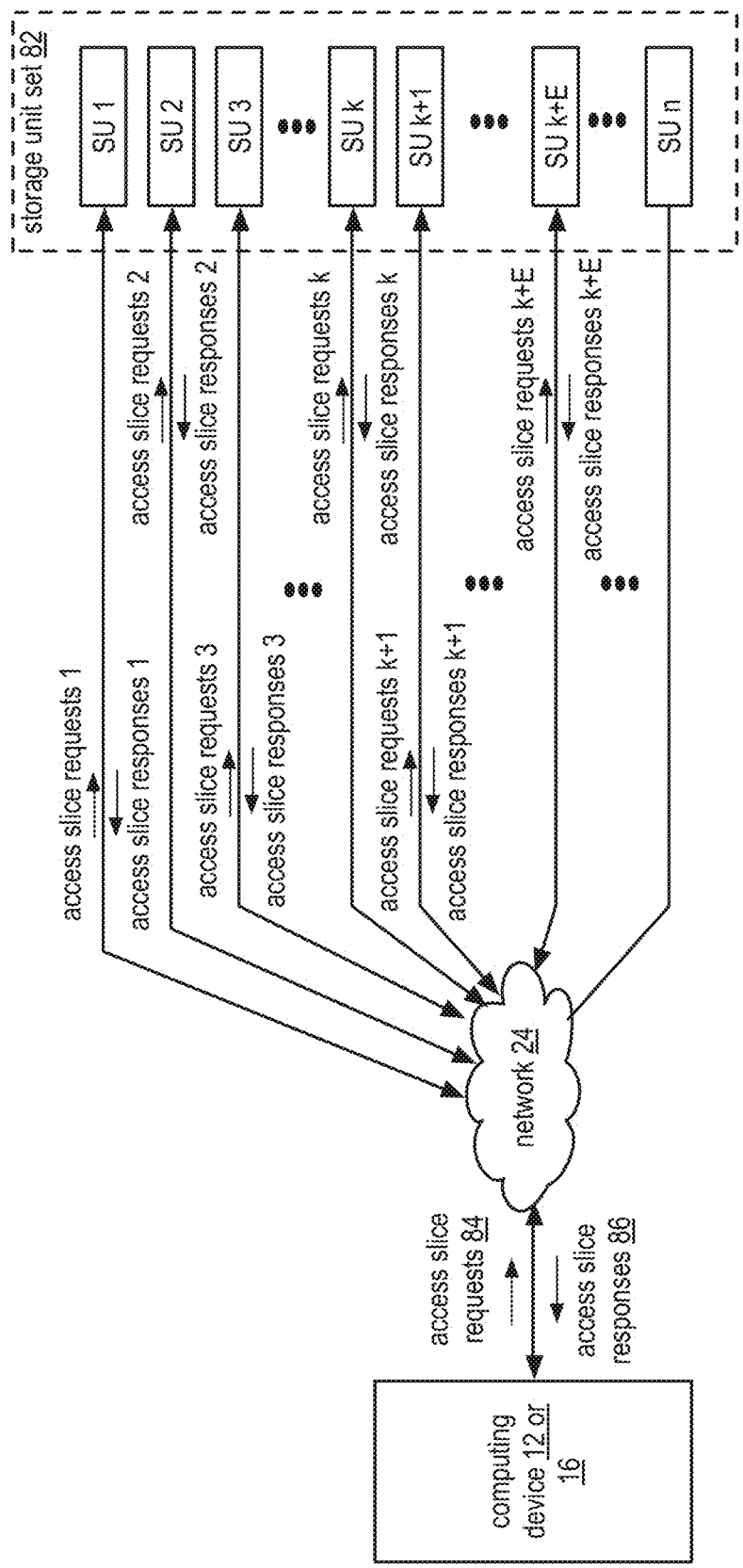
FIG. 9 is a schematic block diagram of another embodiment of a dispersed storage network (DSN) in accordance with the present invention.

FIG. 9 is a schematic block diagram of an embodiment of a dispersed storage network (DSN) that includes computing device 12 or 16 and network 24 of FIG. 1, and a storage unit set 82. The storage unit set 82 includes a set of storage units (SUs) 1-n. Each storage unit may be implemented utilizing the storage unit 36 of FIG. 1. The DSN functions to access data for storage in the storage unit set 82, where the data is dispersed storage error encoded utilizing an information dispersal algorithm (IDA) in accordance with dispersal parameters to produce a plurality of sets of encoded data slices for storage in the set of storage units 1-n. The dispersal parameters include an IDA width=n, a write threshold (WT), and the decode threshold=k, where each set of encoded data slices includes n encoded data slices and the data may be recovered when obtaining a decode threshold number of encoded data slices of each set of encoded data slices.

In an example of operation of the accessing of the data, computing device 12 or 16 determines to access a data object in the storage unit set 82. The accessing includes one or more of storing the data object and retrieving a stored data object. The determining includes at least one of receiving a retrieval request, receiving a storage request, and generating the data object for storage.

Having determined to access the data object, computing device 12 or 16 determines a DSN performance level. The DSN performance level includes one or more of access latency, storage availability, and retrieval reliability. The determining includes one or more of interpreting an error message, initiating a test, interpreting test results, initiating a query, interpreting a received query response, performing a lookup, and receiving the DSN performance level.

Having determined the DSN performance level, computing device 12 or 16 obtains a data object size of the data object. The obtaining includes at least one of counting bites, performing a lookup, estimating, and receiving the data object size. Having obtained the data object size, computing device 12 or 16 determines an expected number of errors when accessing each set of encoded data slices. The determining includes at least one of interpreting historical performance information, receiving the expected number of errors, and interpreting the DSN performance level.

Having determined the expected number of errors, computing device 12 or 16 determines a number of extra encoded data slices for access for each set of encoded data slices based on one or more of the object size of the data object, the dispersal parameters, and expected number of errors when accessing each set of encoded data slices. As a specific example, computing device 12 or 16 sets the number of extra encoded data slices to be substantially the same as the expected number of errors. As another specific example, computing device 12 or 16 sets the number of extra encoded data slices in accordance with a predetermination. As yet another specific example, the computing device 12 or 16 sets the number of extra encoded data slices to be greater than the expected number of errors.

For each set of encoded data slices, the computing device 12 or 16 accesses, via the network 24, a decode threshold number of encoded data slices and an additional extra number of encoded data slices utilizing a set of access slice requests 84. The accessing includes selecting a decode threshold number k plus the extra number of encoded data slices E (e.g., k+E number) of storage units, generating k+E number of access slice request, and sending, via the network 24, the access slice requests to the selected storage units. The access slice requests 84 include at least one of a write slice request when storing data and a read slice request when retrieving data. For example, the computing device 12 or 16 issues k access slice requests 84 to storage units 1-k with regards to the decode threshold number of encoded data slices and issues E access slice requests to storage units k+1 through k+E with regards to the extra encoded data slices.

Having issued the slice access requests 84, computing device 12 or 16 receives, via the network 24, access slice responses 86 from at least some of the storage units. For example, the computing device 12 or 16 receives, via the network 24, access slice responses 1 though k+E. Alternatively, or in addition to, computing device 12 or 16 issues further access slice requests 84 to one or more other storage units when not receiving at least a decode threshold number of favorable access slice responses for each set of encoded data slices.

Figure 10:
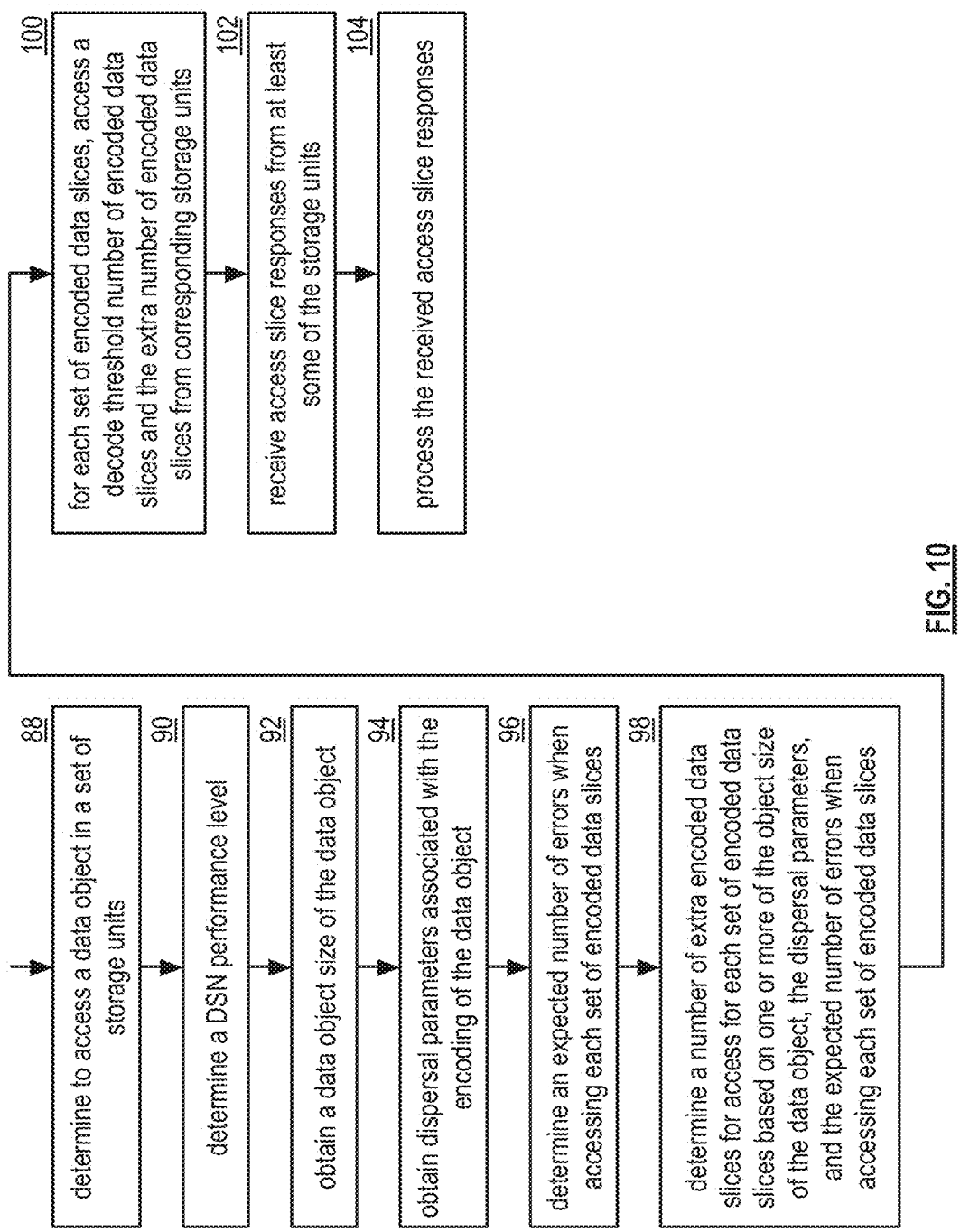
FIG. 10 is a logic diagram illustrating an example of accessing data in accordance with the present invention.

FIG. 10 is a flowchart illustrating an example of accessing data. The method begins or continues at step 88 where a processing module (e.g., of computing device 12 or 16) determines to access the data object in a set of storage units of a dispersed storage network (DSN). The determining includes at least one of receiving a request and generating the data object for storage. The method continues at step 90 where the processing module determines a DSN performance level. The determining includes at least one of interpreting an error message, interpreting test results, interpreting a received query response, performing a lookup, and receiving the DSN performance level.

The method continues at step 92 where the processing module obtains a data object size of the data object. The obtaining includes at least one of counting bites of the data object, performing a lookup, receiving, and estimating. The method continues at step 94 where the processing module obtains dispersal parameters associated with the encoding of the data object. The obtaining includes at least one of receiving, performing a lookup, and interpreting system registry information.

The method continues at step 96 where the processing module determines an expected number of errors when accessing each set of encoded data slices. The determining includes at least one of interpreting historical performance information, receiving the expected number of errors, and interpreting the DSN performance level. The method continues at step 98 where the processing module determines a number of extra encoded data slices for access for each set of encoded data slices based on one or more of the object size of the data object, the dispersal parameters, and the expected number of errors when accessing each set of encoded data slices. The determining includes at least one of setting the number of extra encoded data slices to be substantially the same as the expected number of errors, setting the number of extra encoded data slices in accordance with a predetermination, and setting the number of extra encoded data slices to be greater than expected number of errors.

For each set of encoded data slices, the method continues at step 100 where the processing module accesses a decode threshold number of encoded data slices and the extra number of encoded data slices from corresponding storage units. The accessing includes one or more of selecting storage units (e.g., based on a desired level of performance), generating access slice request, and sending the access slice requests to the selected storage units.

The method continues at step 102 where the processing module receives access slice responses from at least some of the storage units. The receiving includes recovering encoded data slices from read slice responses when retrieving data and interpreting a status from write slice responses when storing data. The method continues at step 104 where the processing module processes the received access slice responses. For example, when retrieving the data object, the processing module decodes the recovered encoded data slices to reproduce the data object. As another example, when storing the data object, the processing module aggregates status of the received write slice responses to produce a storage status indicator. The processing received access slice responses may further include issuing further access slice requests when an unfavorable number of access slice responses has been received (e.g., when a decode threshold number of favorable access slice responses has not been received within an access time frame).

FIGS. 11A-B are schematic block diagrams of another embodiment of a dispersed storage network (DSN) that includes computing device 12 or 16 of FIG. 1 and network 24 of FIG. 1, and storage unit set 82 of FIG. 9. The storage unit set 82 includes a set of storage units (SUs) 1-n. Each storage unit may be implemented utilizing the storage unit 36 of FIG. 1. The DSN functions to store data in the storage unit set 82 for subsequent retrieval, where the data is dispersed storage error encoded utilizing an information dispersal algorithm (IDA) in accordance with dispersal parameters to produce a plurality of sets of encoded data slices for storage in storage unit set 82. The dispersal parameters includes an IDA width=n, a write threshold (WT), and the decode threshold=k, where each set of encoded data slices includes n encoded data slices and the data may be recovered when obtaining a decode threshold number of encoded data slices of each set of encoded data slices.

FIG. 11A illustrates steps of an example of operation of the storing of the data, where computing device 12 or 16 determines to store a data object in storage unit set 82. The determining includes at least one of receiving a storage request and generating the data object for storage. Having determined to store the data object, computing device 12 or 16 determines a DSN performance level. The DSN performance level includes one or more of access latency, storage availability, and retrieval reliability. The determining includes one or more of interpreting an error message, initiating a test, interpreting test results, initiating a query, interpreting a received query response, performing a lookup, and receiving the DSN performance level.

Having determined the DSN performance level, computing device 12 or 16 obtains a data object size of the data object. The obtaining includes at least one of counting bytes, performing a lookup, estimating, and receiving the data object size. Having obtained the data object size, computing device 12 or 16 determines an expected number of errors when storing each set of encoded data slices. The determining includes at least one of interpreting historical performance information, receiving the expected number of errors, and interpreting the DSN performance level.

Having determined the expected number of errors, computing device 12 or 16 determines a number of extra encoded data slices for access for each set of encoded data slices based on one or more of the object size of the data object, the dispersal parameters, and the expected number of errors when accessing each set of encoded data slices. As a specific example, computing device 12 or 16 sets the number of extra encoded data slices to be substantially the same as the expected number of errors. As another specific example, computing device 12 or 16 sets the number of extra encoded data slices in accordance with a predetermination. As yet another specific example, computing device 12 or 16 sets the number of extra encoded data slices to be greater than the expected number of errors.

For each set of encoded data slices, computing device 12 or 16 stores, via the network 24, a desired number of encoded data slices and an additional extra number of encoded data slices utilizing a set of write slice requests. The desired number may include at least one of the decode threshold number, the write threshold number (WT), and a target width number when utilizing virtual storage slots in addition to physical storage units. The storing includes selecting the desired number plus the extra number of encoded data slices E (e.g., WT+E number) of storage units, generating WT+E number of write slice requests 106, and sending, via the network 24, the write slice requests 106 to the selected storage units. For example, computing device 12 or 16 issues WT write slice requests to storage units 1 through WT with regards to the write threshold number of encoded data slices and issues E write slice requests to storage units WT+1 through WT+E with regards to the extra encoded data slices.

Having issued the write slice requests 106, computing device 12 or 16 receives, via the network 24, write slice responses 108 from at least some of the storage units. For example, computing device 12 or 16 receives, via the network 24, write slice responses 1 though WT+E. Alternatively, or in addition to, computing device 12 or 16 issues further write slice requests to one or more other storage units when not receiving at least a desired number of favorable write slice responses for each set of encoded data slices.

Having received the write slice responses 108, computing device 12 or 16, for each set of encoded data slices, determines a number of favorably stored encoded data slices based on the received write slice responses (e.g., by counting favorable write slice responses).

FIG. 11B illustrates further steps of the example of operation of the storing of the data, where when computing device 12 or 16 determines that the number of favorably stored encoded data slices for each set of encoded data slices is at least the desired number, issues, via the network 24, commit slice requests 110 to a desired number of storage units of storage units associated with favorable storage. The issuing includes selecting the desired number of storage units of the storage units associated with a favorable storage (e.g., selecting units associated with most favorable performance levels, using a predetermination, a random selection), generating the commit slice request, and sending the commit slice requests 110 to the selected desired number of storage units. As a specific example, computing device 12 or 16 issues, via network 24, a write threshold number of commit slice requests (e.g., commit slice requests 1 through WT) to storage units 1 through WT when storage units 1 through WT are associated with the most favorable performance level. Each storage unit receiving a commit slice request activates visibility of a corresponding encoded data slice to enable subsequent retrieval of the encoded data slice.

Having issued the commit slice requests 110, computing device 12 or 16 issues, via network 24, rollback slice requests 112 to a remaining extra number of storage units. The issuing includes identifying the remaining extra number of storage units, generating the rollback slice requests 112, and sending, via network 24, the rollback slice requests 112 to the identified remaining extra number of storage units. As a specific example, the computing device 12 or 16 identifies storage units WT+1 through WT+E as the remaining extra number E of storage units and sends the network 24 the rollback slice requests 112 to storage units WT+1 through WT+E. Each storage unit receiving the rollback slice request deletes an associated encoded data slice to provide a storage efficiency improvement.

FIG. 12 is a flowchart illustrating another example of storing data, which include similar steps to FIG. 10. The method begins or continues at step 114 where a processing module (e.g., of computing device 12 or 16) determines to store a data object in a set of storage units. The determining includes at least one of receiving a storage request and generating the data object for storage. The method continues with steps 90-94 of FIG. 10 where the processing module determines a dispersed storage network (DSN) performance level, obtains a data object size of the data object, and obtains dispersal parameters associated with the encoding of the data object.

The method continues at step 116 where the processing module determines an expected number of errors when writing each set of encoded data slices. The determining includes at least one of interpreting historical performance information, receiving the expected number of errors, and interpreting the DSN performance level.

The method continues at step 118 where the processing module determines a number of extra encoded data slices for writing for each set of encoded data slices based on one or more of the object size of the data object, the dispersal parameters, and the expected number of errors when writing each set of encoded data slices. The determining includes at least one of setting the number of extra encoded data slices to be substantially the same as the expected number of errors, setting the number of extra slices to be in accordance with a predetermination, and setting the number of extra encoded data slices to be greater than the expected number of errors.

For each set of encoded data slices, the method continues at step 120 where the processing module stores a desired number of encoded data slices and the extra number of encoded data slices and corresponding storage units. The storing includes selecting the corresponding storage units (e.g., a write threshold number plus the extra number) based on storage unit performance, generating write slice requests, and sending the write slice requests to the selected storage units.

The method continues at step 122 where the processing module receives write slice responses from at least some of the storage units. The receiving includes one or more of interpreting status from the received write slice responses and issuing further write slice requests to one or more other storage units when not receiving at least the desire number of favorable access slice responses for each set of encoded data slices.

For each set of encoded data slices, the method continues at step 124 where the processing module determines a number of favorably stored encoded data slices based on the received write slice responses. The determining includes at least one of interpreting the write slice responses to count the number of favorably stored encoded data slices and receiving an indicator number. When the number of favorably stored encoded data slices for each set of encoded data slices is at least the desire number, the method continues at step 126 where the processing module issues commit slice requests to the desired number of storage units associated with a favorable storage. For example, the processing module selects the desired number of storage units, generates the commit slice request, and sends the commit slice requests to the selected desired number of storage units.

The method continues at step 128 where the processing module issues rollback slice requests to the remaining number of storage units to facilitate deletion of extra encoded data slices. For example, the processing module selects the remaining extra number of storage units, generates the rollback slice request, and sends the rollback slice requests to the selected remaining extra number of storage units.

FIG. 13A is a schematic block diagrams of a data access optimization protocol in a dispersed storage network (DSN) that includes computing device 12 or 16 and storage unit set 82. Storage unit set 82 includes storage units (SUs) 1–n. Computing device 12 or 16 is operable to determine a data access optimization protocol 142 to find an optimum balance of throughput and latency tradeoff when processing a data access request 146 regarding a data segment stored (or to be stored) as a set of encoded data slices in storage unit set 82.

Where a data access request 146 is performed against up to a pillar width number of storage units, but for which some threshold number 132 (e.g., a decode threshold (the amount of encoded data slices required to reconstruct the data segment), write threshold (the number of favorable write responses required to initiate execution of a next phase of the write operation), etc.) is required to complete the data access request 146, there is often a tradeoff between latency and throughput. For example, a "read all" data access request (e.g., reading encoded data slices from a pillar width number of storage units) can handle up to pillar width number minus a decode threshold number of unexpected errors, but requires pillar width/decode threshold number more bandwidth than a "read from threshold" data access request (e.g., reading encoded data slices from a decode threshold number of storage units). A "read from threshold" data access request does not waste throughput, but any unexpected error will require another read operation resulting in increased latency (e.g., having to send additional requests after any of the first fail).

Likewise, a "write all" data access request (e.g., writing encoded data slices to a pillar width number of storage units) can handle up to pillar width number minus a write threshold number of unexpected errors, but requires width number/ write threshold number more bandwidth than a "write to threshold" data access request (e.g., writing encoded data slices to a write threshold number of storage units). A "write to threshold" data access request does not waste throughput or storage, but any unexpected error will require another write operation and network transfer.

As the ratio between pillar width number and decode threshold, or pillar width number and write threshold decreases, the strategy of "read all" or "write all" becomes more attractive, since the marginal increase in cost is dependent on the ratio. However, for many systems, the ratio between them can be great (50% or higher), in which case "read all" or "write all" might be prohibitively expensive. For example, if storage units respond as expected 99% of the time, then by sending 3 additional requests, the probability of seeing more than 3 failures may approach 1 in 1,000,000 and thereby enable meeting stringent service level agreement (SLA) governing response time. Instead of compromising between "read all" and "read from threshold" and "write all" or "write from threshold," computing device 12 or 16 determines data access optimization protocol 142 to find an optimum balance of throughput and latency tradeoffs.

In an example of operation, computing device 12 or 16 detects a triggering event to establish data access optimization protocol 142 for at least a portion of the DSN. For example, computing device 12 or 16 receives a data access request 146 regarding a data segment stored (or to be stored) as a set of encoded data slices in storage unit set 82 which triggers the establishing of the data access optimization protocol 142. As another example, the establishing the data access optimization protocol 142 is triggered on a periodic basis (e.g., once a day, every 4 hours, etc.). As another example, the identity of a user issuing the data access request 146 for the data segment triggers the establishing of the data access optimization protocol 142. As other examples, the system error rate (e.g., the actual error rate of the at least a portion of the DSN) dropping below a threshold and/or the error rate parameter (e.g., an error rate based on subscription data 140 (e.g., SLA)) exceeding an upper threshold trigger the establishing of the data access optimization protocol 142. As another example computing device 12 or 16 receives a system command to establish the data access optimization protocol 142.

To establish the data access optimization protocol 142, computing device 12 or 16 determines an error rate parameter 136 based on subscription data 140 (e.g., the SLA) regarding the at least a portion of the DSN. For example, referring to FIG. 13B which depicts an example of determining an offset value 134 of the data access threshold plus protocol, the error rate parameter 136 may specify an upper error limit of $10^{\wedge}-4$, $10^{\wedge}-5$, $10^{\wedge}-6$, $10^{\wedge}-7$, or $10^{\wedge}-8$ system errors set by the SLA (shown in FIG. 13B as "desired error rate parameter options"). Computing device 12 or 16 then determines the system error rate 138 of the at least a portion of the DSN. The system error rate 138 is the actual error rate of the at least a portion of the DSN and includes one or more of access latency, storage availability, and retrieval reliability. The system error rate 138 may be determined by one or more of interpreting an error message, initiating a test, interpreting test results, initiating a query, interpreting a received query response, performing a lookup, and receiving the system error rate.

Computing device 12 or 16 establishes a data access threshold plus protocol 130 based on the error rate parameter 136 and the system error rate 138. The data access threshold plus protocol 130 corresponds to at least a portion of the data access optimization protocol 142 and includes a value that is greater than threshold number 132 (e.g., the minimum number of encoded data slices required to execute data access request 146). To establish the data access threshold plus protocol 130, computing device 12 or 16 performs a function on the error rate parameter 136 and the system error rate 138 to determine offset value 134 (e.g., offset value 134=f(error rate parameter 136; system error rate 138)).

Referring to FIG. 13B, with the error rate parameter 136 set at a desired option (e.g., based on subscription data 140), computing device 12 or 16 evaluates the current system error rate 138 and determines an offset value 134 to achieve optimal balance of throughput and latency tradeoff. For example, when error rate parameter 136 is set at $10^{\wedge}-6$, the offset value 134 is determined to be 1 based on the intersection of the system error rate 138 and the error rate parameter 136. As the error rate parameter 136 reaches stricter levels (e.g., $10^{\wedge}-8$) the offset value 134 in the example shown in FIG. 13B increases as the system error rate 138 performs below the strict standard at a given time.

Computing device 12 or 16 establishes the data access threshold plus protocol 130 based on the threshold number 132 and the offset value 134. For example, when the data access request 146 is a read request, the threshold number 132 is a decode threshold number (e.g., the number of encoded data slices required to reconstruct the data segment) and computing device 12 or 16 performs a read function on the error rate parameter 136 and the system error rate 138 to determine offset value 134. When the data access request 146 is a write request, the threshold number 132 is a write threshold number (e.g., the number of encoded data slices required to write the data segment) and computing device 12 or 16 performs a write function on the error rate parameter 136 and the system error rate 138 to determine offset value 134. As another example, computing device 12 or 16 performs a lookup to establish the data access threshold plus protocol.

Computing device 12 or 16 determines a threshold number plus the offset value as an initial value and estimates the processing resource consumption of the at least a portion of the DSN based on the initial value. When the estimated processing resource consumption based on the pillar width data access is within the processing resource consumption threshold of the estimated processing resource consumption based on the initial value, computing device 12 or 16 uses the pillar width data access as the data access threshold plus protocol. When the estimated processing resource consumption based on a pillar width data access is over a processing resource consumption threshold of the estimated processing resource consumption based on the initial value, computing device 12 or 16 uses the initial value as the data access threshold plus protocol. In other words, if using the initial value as the data access threshold plus protocol results in processing resource consumption too similar to using the pillar width data access as the data access threshold plus protocol, the pillar width data access will be used.

When the data access optimization protocol 142 has been established, computing device 12 or 16 generates a set of data access requests 144 for the set of encoded data slices 146 in accordance with the data access optimization protocol 142. For example, computing device 12 or 16 generates a threshold number plus the offset value number of data access requests 144 for the threshold number plus the offset value number of encoded data slices, where the threshold number plus the offset value number is less than the pillar width number of encoded data slices. Computing device 12 or 16 sends the set of data access requests 144 to storage unit set 82 affiliated with the at least a portion of the DSN.

As an example, with the error rate parameter 136 set at $10^{\wedge}-6$ (in FIG. 13B), the offset value 134 is determined to be 1 (based on the system error rate 138). When the data access request 146 is a read request, the threshold number 132 is a decode threshold number. For example, dispersed error encoding function parameters set the decode threshold number as 3, and the pillar width number as 5. Therefore, the threshold number plus the offset value number (e.g. 3+1) is 4. Computing device 12 or 16 sends 4 data access requests as shown to 4 storage units (e.g., shown here as SUs 1-4) each storing 1 of 4 encoded data slices required for the read request.

FIG. 14 is a logic diagram of a method of utilizing a data access optimization protocol in a dispersed storage network (DSN). The method begins with step 148 where a computing device of the DSN detects a triggering event to establish a data access optimization protocol for at least a portion of the DSN. For example, the computing device receives a data access request regarding a data segment stored as a set of encoded data slices in a set of storage units affiliated with the at least a portion of the DSN which triggers the establishing of the data access optimization protocol. As another example, the establishing the data access optimization protocol is triggered on a periodic basis (e.g., once a day, every 4 hours, etc.). As another example, the identity of a user issuing the data access request for the data segment triggers the establishing of the data access optimization protocol. As other examples, the system error rate (e.g., the actual error rate of the at least a portion of the DSN) dropping below a threshold and/or the error rate parameter (e.g., an error rate based on subscription data (e.g., a service level agreement (SLA)) exceeding an upper threshold trigger the establishing of the data access optimization protocol. As another example the computing device receives a system command to establish the data access optimization protocol.

When the computing device does not detect the triggering event to establish the data access optimization protocol, the method branches back to step 148 where the computing device waits to detect the triggering event. When the computing device detects the triggering event to establish the data access optimization protocol, the method continues with step 150 where the computing device determines an error rate parameter based on subscription data (e.g., an SLA) regarding the at least a portion of the DSN. For example, the error rate parameter may specify an upper error limit of 10^-8 system errors set by the SLA.

The method continues with step 152 where the computing device determines the system error rate of the at least a portion of the DSN. The system error rate is the actual error rate of the at least a portion of the DSN and includes one or more of access latency, storage availability, and retrieval reliability. The system error rate may be determined by one or more of interpreting an error message, initiating a test, interpreting test results, initiating a query, interpreting a received query response, performing a lookup, and receiving the system error rate.

The method continues with step 154 where the computing device establishes a data access threshold plus protocol based on the error rate parameter and the system error rate. The data access threshold plus protocol corresponds to at least a portion of the data access optimization protocol and includes a value that is greater than the threshold number (e.g., the minimum number of encoded data slices required to execute a data access request). To establish the data access threshold plus protocol, the computing device performs a function on the error rate parameter and the system error rate to determine an offset value and establishes the data access threshold plus protocol based on the threshold number and the offset value.

For example, when the data access request is a read request, the threshold number is a decode threshold number (e.g., the number of encoded data slices required to reconstruct the data segment). To establish the data access threshold plus protocol, the computing device performs a read based function on the error rate parameter and the system error rate to determine offset value. The computing device establishes the data access threshold plus protocol based on the decode threshold number and the offset value. When the data access request is a write request, the threshold number is a write threshold number (e.g., the number of encoded data slices required to write the data segment). To establish the data access threshold plus protocol, the computing device performs a write based function on the error rate parameter and the system error rate to determine the offset value. The computing device establishes the data access threshold plus protocol based on the write threshold number and the offset value. As another example, the computing device performs a lookup to establish the data access threshold plus protocol.

The computing device determines an initial value for the threshold number plus the offset value and estimates the processing resource consumption of the at least a portion of the DSN based on the initial value. The computing device estimates processing resource consumption of the at least a portion of the DSN based on pillar width data access. When the estimated processing resource consumption based on the pillar width data access is within a processing resource consumption threshold of the estimated processing resource consumption based on the initial value, the computing device uses the pillar width data access as the data access threshold plus protocol. When the estimated processing resource consumption based on a pillar width data access is over the processing resource consumption threshold of the estimated processing resource consumption based on the initial value, the computing device uses the initial value as the data access threshold plus protocol.

When the data access optimization protocol has been established, the method continues with step 158 where the computing device generates a set of data access requests for the set of encoded data slices in accordance with the data access optimization protocol. For example, computing device generates the threshold number plus the offset value number of data access requests for the threshold number plus the offset value number of encoded data slices, where the threshold number plus the offset value number is less than the pillar width number of encoded data slices. The method continues with step 160 where the computing device sends the set of data access requests a set of storage units affiliated with the at least a portion of the DSN. When the data access optimization protocol has not been established, the method continues with step 156 where the computing device continues to establish the data access optimization protocol.

FIG. 15 is a schematic block diagram of another example of a dispersed storage network (DSN) that includes computing device 12 or 16 and storage unit set 82. Computing device 12 or 16 is operable to establish a write threshold plus value 174 for use in DSN write operations. Utilizing the write threshold plus value 174 allows the system to overcome unexpected write errors without resulting in the extra latency required to select new storage locations and issue another round of write requests.

In an example of operation, computing device 12 or 16 receives a write operation request 178 for storage of a data segment of a data object in at least a portion of the DSN. The data segment is dispersed error encoded in accordance with dispersed storage error parameters to produce a set of encoded data slices (EDSs) 162. Computing device 12 or 16 determines a write target number based on information related to the data segment (e.g., user identification (ID), vault ID, service subscription, etc.). In this example, computing device determines the write target number 168 to be 14. Further, the dispersed storage error encoding parameters dictate that the decode threshold number 164 is 10 (e.g., the number of encoded data slices required to reconstruct the data segment), the write threshold number 16 is 12 (e.g., a number of favorable write responses to initiate execution of a next phase of the write operation), and the pillar width number is 172 is 16. As shown, the write target number 168 is greater than or equal to the write threshold number 166.

Computing device 12 or 16 determines a write extra number 170 based on system error rate of the at least a portion of the DSN. The system error rate is the actual error rate of the at least a portion of the DSN and includes one or more of access latency, storage availability, and retrieval reliability. The system error rate may be determined by one or more of interpreting an error message, initiating a test, interpreting test results, initiating a query, interpreting a received query response, performing a lookup, and receiving the system error rate. To determine the write extra number 170, computing device 12 or 16 performs a function on an error rate parameter (e.g., an error rate established by a service level agreement (SLA)) and the system error rate. As another example, computing device 12 or 16 performs a lookup to determine the write extra number 170. In this example, the write extra number 170 is determined to be 1.

Computing device 12 or 16 establishes the write threshold plus value 174 based on the write target number 168 and the write extra number 170. For example, computing device 12 or 16 establishes the write threshold plus value 174 to be 15 (14+1) when the write target number 168 is 14 and the write extra number 170 is 1. Computing device 12 or 16 generates a set of write requests 176 for a subset of the set of encoded data slices 162, where the subset includes the write threshold plus value 174 of encoded data slices of the set of encoded data slices 162 (e.g., 15 write requests). Computing device 12 or 16 sends the set of write requests 176 to the storage unit set 82 affiliated with the at least a portion of the DSN. For example, 15 write requests are sent to 15 storage units regarding 15 encoded data slices.

Computing device 12 or 16 receives favorable write responses from storage units in the set of storage units 82. When a write threshold number of favorable write responses have been received from a subset of storage units of the storage unit set 82, computing device 12 or 16 sends a set of next phase write operation requests to the subset of storage units. For example, when computing device 12 or 16 receives favorable responses from storage units 1-12, computing device 12 or 16 sends a set of next phase write operation requests to storage units 1-12.

Having more than a write target number 168 of encoded data slices stored wastes storage utilization. To overcome this wasted utilization, when the write target number of favorable write responses have been received from a subset of storage units of the storage units, computing device 12 or 16 generates one or more rollback requests. Computing device 12 or 16 sends the one or more rollback requests to one or more storage units of the storage unit set 82, where the one or more storage units are not within the subset of storage units. For example, if computing device 12 or 16 receives favorable responses from storage units 1-15, computing device 12 or 16 sends rollback requests to storage unit 14 or storage unit 15 (e.g., a storage unit not included include in the storage unit 1-12 subset that were sent next phase write operation requests).

When a write target number of favorable responses have not been received from the storage unit set 82 within a given time period, computing device 12 or 16 sends at least one new write request to a storage unit not already sent a write request of the set of write requests 176. For example, when computing device 12 or 16 receives favorable responses from storage units 1-13 out of SUs 1-15, computing device 12 or 16 sends a write request to storage unit 16.

FIG. 16 is a logic diagram of a method of utilizing a write threshold plus value in dispersed storage network (DSN) write operations. The method begins with step 180 where a computing device of the DSN receives a write operation request for storage of a data segment of a data object in at least a portion of the DSN. The data segment is dispersed error encoded in accordance with dispersed storage error parameters to produce a set of encoded data slices. The method continues with step 182 where the computing device determines a write target number based on information related to the data segment (e.g., user identification (ID), vault ID, service subscription, etc.).

The method continues with step 184 where the computing device determines a write extra number based on system error rate of the at least a portion of the DSN. The system error rate is the actual error rate of the at least a portion of the DSN and includes one or more of access latency, storage availability, and retrieval reliability. The system error rate may be determined by one or more of interpreting an error message, initiating a test, interpreting test results, initiating a query, interpreting a received query response, performing a lookup, and receiving the system error rate. To determine the write extra number, the computing device performs a function on an error rate parameter (e.g., an error rate established by a service level agreement (SLA)) and the system error rate. As another example, the computing device performs a lookup to determine the write extra number.

The method continues with step 186 where the computing device establishes the write threshold plus value based on the write target number and the write extra number. For the set of encoded data slices, a decode threshold number of encoded data slices is required to reconstruct the data segment, where a write threshold number corresponds to a number of favorable write responses to initiate execution of a next phase of the write operation. The write target number is greater than or equal to the write threshold number.

The method continues with step 188 where the computing device generates a set of write requests for a subset of the set of encoded data slices, where the subset includes the write threshold plus value of encoded data slices of the set of encoded data slices. The method continues with step 190 where the computing device sends the set of write requests to a set of storage units affiliated with the at least a portion of the DSN.

The computing device receives favorable write responses from storage units in the set of storage units. When a write threshold number of favorable write responses have been received from a subset of storage units of the set of storage units, the computing device sends a set of next phase write operation requests to the subset of storage units. However, having more than a write target number of encoded data slices stored wastes storage utilization. To overcome this wasted utilization, when the write target number of favorable write responses have been received from a subset of storage units of the storage units, the computing device generates one or more rollback requests. The computing device sends the one or more rollback requests to one or more storage units of the set of storage units, where the one or more storage units are not within the subset of storage units. When a write target number of favorable responses have not been received from the set of storage units within a given time period, the computing device sends at least one new write request to a storage unit not already sent a write request of the set of write requests.

When the computing device receives a second write operation request for storage of a second data segment of the data object in the at least a portion of the DSN, the computing device dispersed storage error encodes the second data segment in accordance with the dispersed storage error parameters (e.g., the same parameters used to dispersed storage error encode the data segment) to produce a second set of encoded data slices. The computing device determines a second write target number based on information related to the second data segment and determines a second write extra number based on the system error rate of the at least a portion of the DSN. The computing device establishes a second write threshold plus value based on the second write target number and the second write extra number and generates a second set of write requests for the subset of the set of encoded data slices, where the subset includes the second write threshold plus value of encoded data slices of the second set of encoded data slices. The computing device sends the second set of write requests to the set of storage units affiliated with the at least a portion of the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
receiving, by a computing device of a dispersed storage network (DSN), a write operation request for storage of a data segment of a data object in at least a portion of the DSN;
determining, by the computing device, a write target number based on information related to the data segment;
determining, by the computing device, a write extra number based on system error rate of the at least a portion of the DSN;
establishing, by the computing device, a write threshold plus value based on the write target number and the write extra number, wherein, for a set of encoded data slices, a decode threshold number of encoded data slices is required to reconstruct the data segment, wherein a write threshold number corresponds to a number of successful write responses to initiate execution of a next phase of the write operation, and wherein the write target number is greater than or equal to the write threshold number;
generating, by the computing device, a set of write requests for a subset of the set of encoded data slices, wherein the subset includes the write threshold plus value of encoded data slices of the set of encoded data slices; and
sending, by the computing device, the set of write requests to a set of storage units affiliated with the at least a portion of the DSN.

2. The method of claim 1 further comprises:
receiving, by the computing device, successful write responses from storage units in the set of storage units; and when the write target number of successful write responses have been received from a subset of storage units of the storage units:
generating, by the computing device, one or more rollback requests; and
sending, by the computing device, the one or more rollback requests to one or more storage units of the set of storage units, wherein the one or more storage units are not within the subset of storage units.

3. The method of claim 1 further comprises:
receiving, by the computing device, successful write responses from storage units in the set of storage units; and
when a write threshold number of successful write responses have been received from a subset of storage units of the storage units, sending, by the computing device, a set of next phase write operation requests to the subset of storage units.

4. The method of claim 1, wherein the determining the write extra number comprises:
performing, by the computing device, a function on an error rate parameter and the system error rate to determine the write extra number.

5. The method of claim 1 further comprises:
dispersed storage error encoding, by the computing device, the data segment in accordance with dispersed storage error parameters to produce the set of encoded data slices.

6. The method of claim 5 further comprises:
receiving, by the computing device, a second write operation request for storage of a second data segment of the data object in the at least a portion of the DSN;

dispersed storage error encoding, by the computing device, the second data segment in accordance with the dispersed storage error parameters to produce a second set of encoded data slices;
determining, by the computing device, a second write target number based on information related to the second data segment;
determining, by the computing device, a second write extra number based on the system error rate of the at least a portion of the DSN;
establishing, by the computing device, a second write threshold plus value based on the second write target number and the second write extra number;
generating, by the computing device, a second set of write requests for the subset of the set of encoded data slices, wherein the subset includes the second write threshold plus value of encoded data slices of the second set of encoded data slices; and
sending, by the computing device, the second set of write requests to the set of storage units affiliated with the at least a portion of the DSN.

7. The method of claim 1 further comprises:
when the write target number of successful responses have not been received from the set of storage units within a given time period, sending, by the computing device, at least one new write request to a storage unit not already sent a write request of the set of write requests.

8. A computing device of a dispersed storage network (DSN), the computing device comprises:
an interface;
memory; and
a processing circuit operably coupled to the memory and the interface, wherein the processing circuit is operable to:
receive a write operation request for storage of a data segment of a data object in at least a portion of the DSN;
determine a write target number based on information related to the data segment;
determine a write extra number based on system error rate of the at least a portion of the DSN;
establish a write threshold plus value based on the write target number and the write extra number, wherein, for a set of encoded data slices, a decode threshold number of encoded data slices is required to reconstruct the data segment, wherein a write threshold number corresponds to a number of successful write responses to initiate execution of a next phase of the write operation, and wherein the write target number is greater than or equal to the write threshold number;
generate a set of write requests for a subset of the set of encoded data slices, wherein the subset includes the write threshold plus value of encoded data slices of the set of encoded data slices; and
send the set of write requests to a set of storage units affiliated with the at least a portion of the DSN.

9. The computing device of claim 8, wherein the processing circuit is further operable to:

receive successful write responses from storage units in the set of storage units; and when the write target number of successful write responses have been received from a subset of storage units of the storage units:
generate one or more rollback requests; and
send the one or more rollback requests to one or more storage units of the set of storage units, wherein the one or more storage units are not within the subset of storage units.

10. The computing device of claim 8, wherein the processing circuit is further operable to:
receive successful write responses from storage units in the set of storage units; and
when a write threshold number of successful write responses have been received from a subset of storage units of the storage units, send a set of next phase write operation requests to the subset of storage units.

11. The computing device of claim 8, wherein the processing circuit is further operable to determine the write extra number by:
performing a function on an error rate parameter and the system error rate to determine the write extra number.

12. The computing device of claim 8, wherein the processing circuit is further operable to:
dispersed storage error encode the data segment in accordance with dispersed storage error parameters to produce the set of encoded data slices.

13. The computing device of claim 12, wherein the processing circuit is further operable to:
receive a second write operation request for storage of a second data segment of the data object in the at least a portion of the DSN;
dispersed storage error encode the second data segment in accordance with the dispersed storage error parameters to produce a second set of encoded data slices;
determine a second write target number based on information related to the second data segment;
determine a second write extra number based on the system error rate of the at least a portion of the DSN;
establish a second write threshold plus value based on the second write target number and the second write extra number;
generate a second set of write requests for the subset of the set of encoded data slices, wherein the subset includes the second write threshold plus value of encoded data slices of the second set of encoded data slices; and
send the second set of write requests to the set of storage units affiliated with the at least a portion of the DSN.

14. The computing device of claim 8, wherein the processing circuit is further operable to:
when the write target number of successful responses have not been received from the set of storage units within a given time period, send at least one new write request to a storage unit not already sent a write request of the set of write requests.

* * * * *